(12) United States Patent
Kokeguchi

(10) Patent No.: US 7,484,755 B2
(45) Date of Patent: Feb. 3, 2009

(54) AIR BELT AND AIR BELT APPARATUS

(75) Inventor: Akira Kokeguchi, Tokyo (JP)

(73) Assignee: Takata Corporation, Tokyo (JP)

( * ) Notice: Subject to any disclaimer, the term of this patent is extended or adjusted under 35 U.S.C. 154(b) by 343 days.

(21) Appl. No.: 11/493,696

(22) Filed: Jul. 27, 2006

(65) Prior Publication Data

US 2007/0029767 A1  Feb. 8, 2007

(30) Foreign Application Priority Data

Aug. 2, 2005  (JP)  ............... 2005-224296

(51) Int. Cl.
  *B60R 21/18*  (2006.01)
  *B60R 21/237*  (2006.01)
(52) U.S. Cl. .................... 280/733; 280/743.1
(58) Field of Classification Search ............ 280/733, 280/743.1, 728.1
  See application file for complete search history.

(56) References Cited

U.S. PATENT DOCUMENTS

| 5,346,250 | A | 9/1994 | Kamiyama |
| 5,385,367 | A | 1/1995 | Tanaka et al. |
| 6,007,092 | A | 12/1999 | Martz |
| 6,082,763 | A | 7/2000 | Kokeguchi |
| 6,199,905 | B1 | 3/2001 | Lewis |
| 6,217,063 | B1 | 4/2001 | Takeuchi |

FOREIGN PATENT DOCUMENTS

| DE | 198 04 378 A1 | 8/1999 |
| EP | 0 963 884 A1 | 12/1999 |
| JP | 7-164997 | 6/1995 |
| JP | 11-255057 | 9/1999 |
| JP | 11255057 | 9/1999 |

*Primary Examiner*—Ruth Ilan
(74) *Attorney, Agent, or Firm*—Foley & Lardner LLP

(57) ABSTRACT

An air belt includes a folded body of a bag-shaped belt, a cover that surrounds the folded body, and a stitching thread. The bag-shaped belt is formed of an overlapped body by overlapping two material sheets and each of the peripheral edge portions of the material sheets in the overlapped body is combined by a seam to form a bag shape. In the folded body, stitching thread is provided in an outer edge side from the seam.

6 Claims, 3 Drawing Sheets

(a)

(b)

(c)

(d)

AIR BELT AND AIR BELT APPARATUS

BACKGROUND

The present application relates generally to an air belt and air belt apparatus configured such that a bag-shaped belt is expanded by gas supplied from an inflator so that an occupant of a motor vehicle is kept under restraint when the motor vehicle encounters a crash or the like.

Japanese Unexamined Patent Application Publication No. 11-255057 provides an example of a conventional air belt and air belt apparatus.

As shown in FIG. 2, an air belt apparatus is provided that keeps an occupant under restraint in a front right seat 1. The air belt apparatus is provided with a retractor for a shoulder belt provided at a lower part of a center pillar 2, a retractor for a lap belt provided at a lower side of the retractor for the shoulder belt, a shoulder belt 6 being withdrawn from the retractor for the shoulder belt and extending through a slip guide 5 provided at an upper part of the center pillar 2, a lap belt 7 that is withdrawn from the retractor for the lap belt 4, a tongue device 8 being fixed to each of ends the shoulder belt 6 and the lap belt 7, a buckle device 9 being fixed to a seat base 10 that is composed of a seat frame or a slide rail, to which the aforementioned tongue device 8 is combined, and an inflator 11 being integrally formed with the buckle device 9.

The retractor for the shoulder belt and the retractor for the lap belt respectively retract the shoulder belt 6 and the lap belt 7 in a manner that allow the shoulder belt 6 and the lap belt 7 to be withdrawn. When an acceleration sensor does not detect acceleration greater than a predetermined value, such as during normal operation, the retractor for the shoulder belt and the retractor for the lap belt permit the belts 6, 7 to be withdrawn, thereby permitting movement of an occupant's body. On the contrary, when the acceleration sensor detects an acceleration of not less than the predetermined value, such as in the event of a crash or the like for the motor vehicle, both the retractor for the shoulder belt and that for the lap belt are configured to lock both the belts, 6 and 7, so that they are unable to be withdrawn and the occupant is kept under restraint. When the acceleration sensor detects the acceleration not less than the predetermined value, propellant is ignited and the inflator 11 generates high-pressure gas by means of combustion of the propellant.

The lap belt 7 is formed of a conventional flat-woven belt made of synthetic resin. On the other hand, part of the shoulder belt 6, which is in contact with a chest region of the occupant, is composed of a cylindrically shaped expandable bag 12 and a webbing 13 that generates tension force in the event of the crash of the motor vehicle while covering an outside of the bag 12. The shoulder belt 6 has a flattened belt-like shape during normal operation. However, when gas is supplied to the bag 12 from the inflator 11 the shoulder belt 6 is expanded and softly keeps the occupant under restraint. When the webbing 13, which is formed by warp knitting, is stretched out in a radial direction due to the expansion of the bag 12 the webbing 13 is contracted in a longitudinal direction, thereby applying an initial tension force to the shoulder belt 6.

FIG. 3 illustrates a cross-section of the shoulder belt 6 in a non-expansion state with the bag 12 being folded back in a switchback-like manner. The bag 12 is integrally formed with the webbing 13 by stitching thread 28 that is easy to rupture.

Because the bag 12, which is in the folded back state, is integrally formed with the webbing 13 by stitching thread 28, the folded state of the bag 12 is maintained and movement of the bag 12 relative to the webbing 13 is prevented. As a result, shoulder belt 6 is formed in a regular flattened shape and the softness of the shoulder belt 6 is maintained. Therefore, the feeling of the shoulder belt 6 is good and the sense of discomfort perceived by the occupant is alleviated. In the event of a crash of the motor vehicle, the stitching thread 28 is ruptured, permitting the expansion of the bag 12 and the webbing 13.

Operation of the air belt apparatus is as follows. When the acceleration sensor detects an acceleration not less than the predetermined value due to the crash of the motor vehicle, the inflator 11 is ignited and high-pressure gas is generated. The generated gas is supplied to the bag 12 of the shoulder belt 6 through a buckle housing 14 and the bag 12 is thereby expanded. When the bag 12 is expanded, the webbing 13 is expanded by pressure and thereby the entire shoulder belt 6 is expanded. As described above, when the shoulder belt 6 is expanded an area of the shoulder belt 6 contacting the chest region of an occupant increases at a greater rate than the expansion of the shoulder belt, permitting the occupant to be more softly restrained.

As described above, when the bag 12 is expanded, because the stitching thread 28 is automatically ruptured by means of the expansion force, the shoulder belt 6 is not substantially restrained from freely expanding by the stitching thread 28.

SUMMARY

According to an embodiment, an air belt that includes an inflatable bag portion adapted to be expanded by gas and folded into a belt-like shape to form a folded body, wherein the bag portion comprises two overlapping material sheets combined together along edges of the sheets to form an inflatable chamber; a stretchable cover for the folded body; and a stitching thread that penetrates the cover and the inflatable portion; wherein the stitching thread is adapted to be ruptured when the air belt is expanded, wherein the stitching thread penetrates the bag portion outside of the inflatable chamber.

According to an embodiment, an air belt apparatus includes an air belt comprising an inflatable bag portion adapted to be expanded by gas and folded into a belt-like shape to form a folded body, wherein the bag portion comprises two overlapping material sheets combined together along edges of the sheets to form an inflatable chamber; a stretchable cover for the folded body; and a stitching thread that penetrates the cover and the inflatable portion; wherein the stitching thread is adapted to be ruptured when the air belt is expanded, wherein the stitching thread penetrates the bag portion outside of the inflatable chamber; and an inflator that is adapted to expand the air belt by supplying gas into the inflatable chamber.

It is to be understood that both the foregoing general description and the following detailed description are exemplary and explanatory only, and are not restrictive of the invention as claimed.

DETAILED DESCRIPTION

Figure 2:
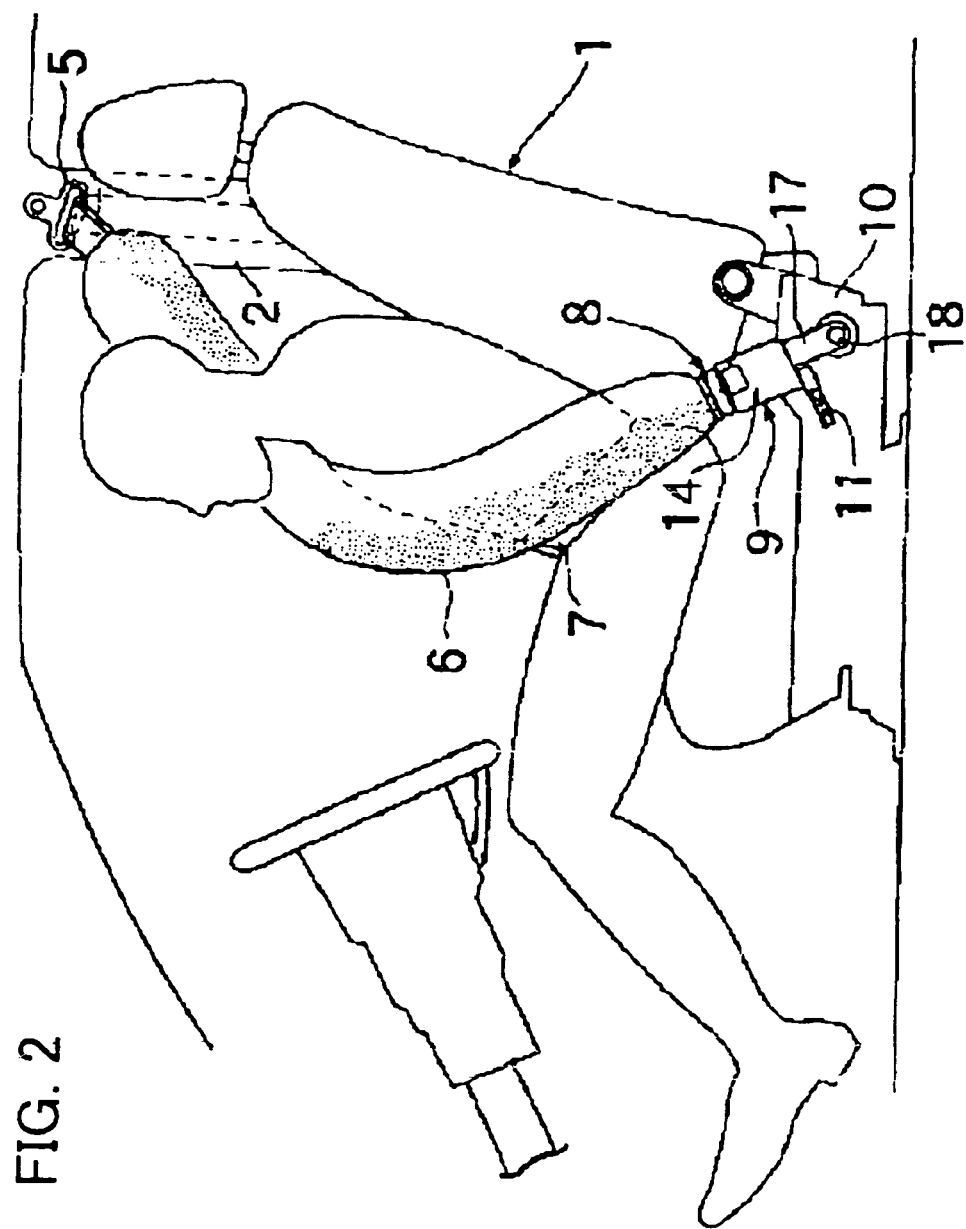
FIG. 2 is a side elevation illustrating a seat of a motor vehicle provided with a conventional air belt apparatus.
Figure 3:
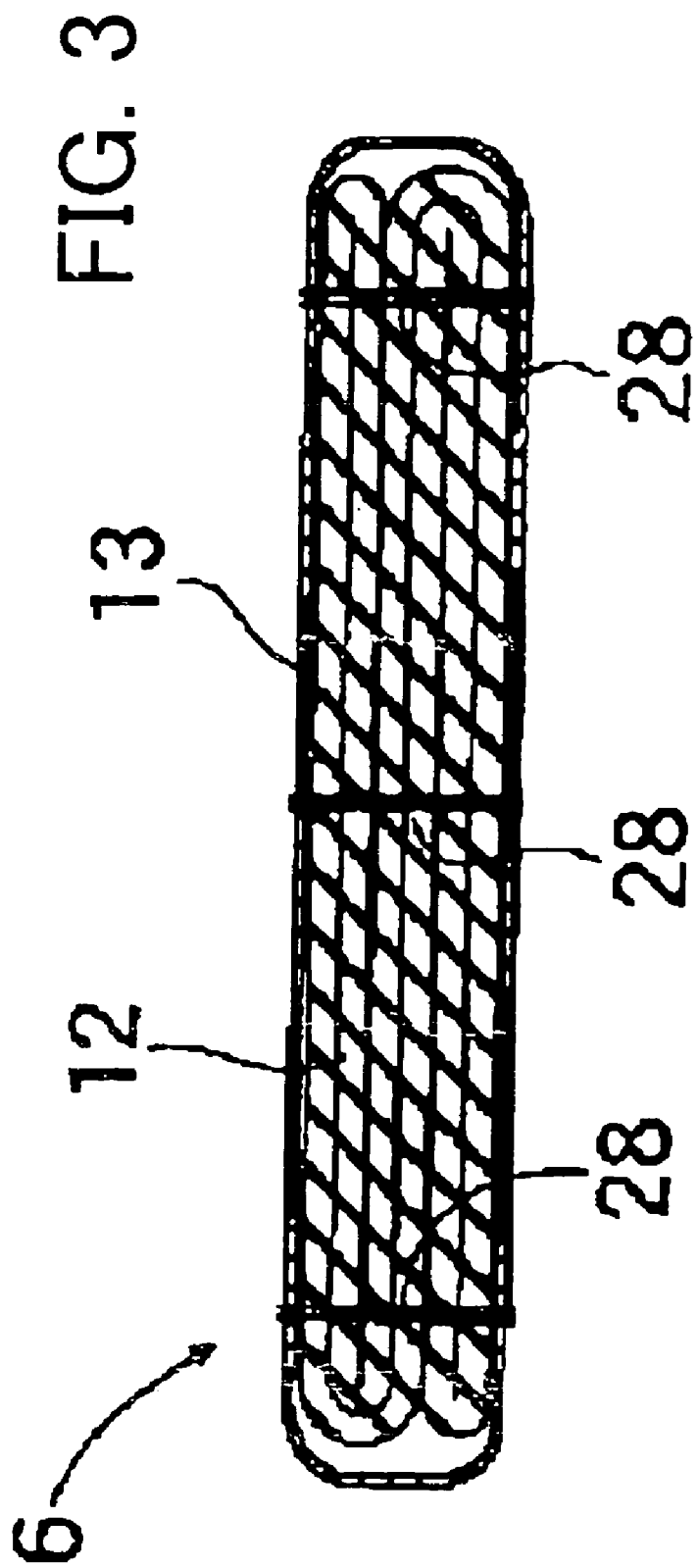
FIG. 3 is a cross-sectional view illustrating a conventional air belt.

In the conventional example described above, when the stitching thread 28 is penetrated through a folded body of the bag-shaped belt (such as in the bag 12 shown in FIGS. 2 and 3), a hole is caused in the bag-shaped belt by a needle or a thread. Because gas is leaked out from the hole when the air belt is expanded, an inflator having a long gas generating duration time is required so that a high internal pressure for the air belt is continuously kept, resulting in high cost.

An object is to provide an air belt in which gas leakage from a hole caused by a stitching thread or a needle in the bag-shaped belt is prevented. A further object is to provide an air belt apparatus using the air belt.

According to an embodiment, an air belt and air belt apparatus include a bag-shaped belt with a folded body and a cover surrounding the folded body of the bag-shaped belt, wherein the bag-shaped belt and cover are integrally formed by stitching thread, wherein the cover cannot freely move relative to the folded body and thereby the feeling perceived by an occupant wearing the air belt is good.

According to an embodiment, although the stitching thread is penetrated through an edge portion of the bag-shaped belt, the stitching thread is not penetrated through the expanding part of the bag-shaped belt that is expanded by means of the gas. Therefore, gas introduced into the bag-shaped belt is not leaked out from the hole caused by the stitching needle or the stitching thread. As a result, an inflator that continuously generates gas for a long time is not required.

According to a further embodiment, because the two side edges of the folded body of the bag-shaped belt are integrally formed with the cover by means of the stitching thread, the wearing feel of the air belt is good.

Figure 1:
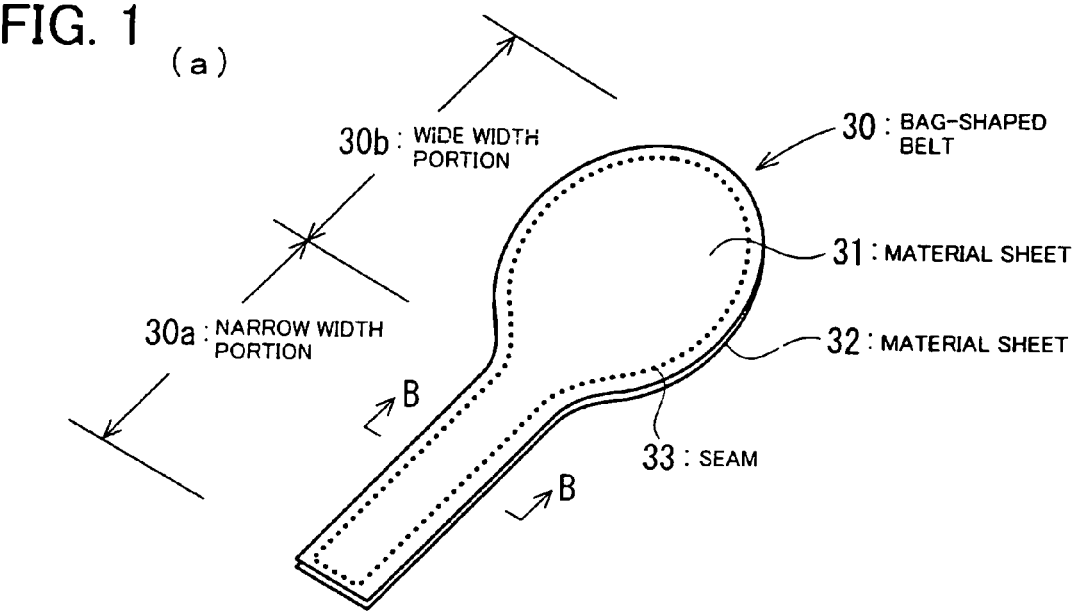
FIG. 1(a) is a perspective view illustrating a bag-shaped belt of an air belt with respect to an embodiment.
FIG. 1(b) is a cross-sectional view along a B-B line in FIG. 1(a).
FIG. 1(c) is a cross-sectional view illustrating the bag-shaped belt being folded back according to an embodiment.
FIG. 1(d) is a cross-sectional view illustrating an embodiment of the air belt.
Figure 1:
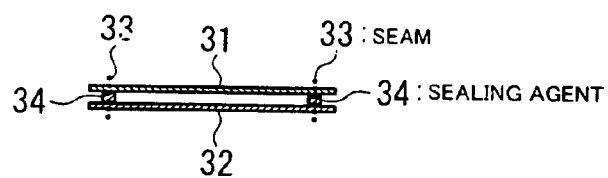
Figure 1:
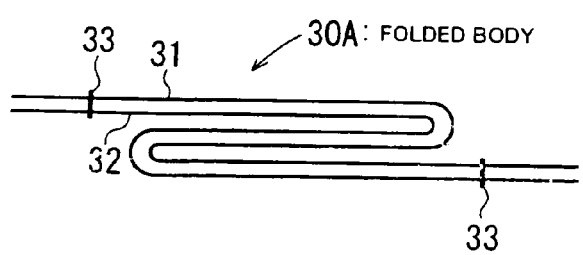
Figure 1:
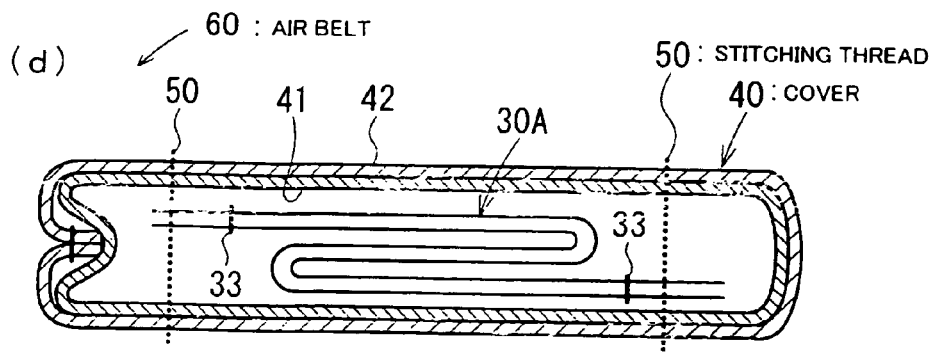

An embodiment of the invention will now be explained in reference to the drawings. FIG. 1(a) is a perspective view illustrating a bag-shaped belt of an air belt with respect to the embodiment, FIG. 1(b) is a cross-section along a B-B line in FIG. 1(a), and FIG. 1(c) is a cross-section illustrating the air belt with respect to the embodiment.

The air belt 60 includes a folded body 30A of a bag-shaped belt 30, a cover 40 that surrounds the folded body 30A, and a stitching thread 50. The bag-shaped belt 30 is formed of an overlapped body by overlapping two material sheets 31, 32 with each of the peripheral edge portions of the material sheets 31, 32 of the overlapped body combined by a seam 33 to form a bag-shape. Seam 33 may be formed with stitching thread or other methods known in the art. In addition, a sealing agent 34 (e.g., a silicone adhesive) may be interposed between each of the portions, combined by the seam 33 of the material sheets 31, 32.

According to another embodiment, the bag-shaped belt 30 is formed of an overlapped body by folding back one material sheet in two.

The bag-shaped belt 30 can include a narrow width portion 30a that is adapted to be placed along an abdomen to a chest region of an occupant, and a wide width portion 30b that is adapted to be disposed at a side of the occupant.

In the bag-shaped belt 30, the wide width portion 30b is folded back along a folding line in a longitudinal direction in a manner so as to have an even width in the longitudinal direction as that of the narrow width portion 30a, and the entire body of the bag-shaped belt 30 is folded back in a zigzag manner (switchback-like manner) along two folding lines to form a folded body 30A, as shown in FIG. 1(c). By folding the wide width portion 30b along the two folding lines in a zigzag manner, the folded body 30A is folded in three. According to this embodiment, side edge portions of the bag-shaped belt 30 respectively extend toward both sides from the portion of the folded body 30A that is folded in three. According to a further embodiment, the two folding lines can be parallel and can extend in a longitudinal direction of the bag-shaped belt 30 to fold the bag-shaped belt 30 in a zigzag manner.

The folded body 30A is surrounded by the aforementioned cover 40. This cover 40 is composed of a mesh cover 41 and a superficial skin cover 42. Although the mesh cover 41 softly stretches in a width direction, the same hardly stretches in a longitudinal direction at all because heating drawing processing is performed in the longitudinal direction. The mesh cover 41 bears a stretching load applied to the air belt 60. The superficial skin cover 42 can be made from a material that provides a soft sensation when contacted by human skin.

As shown in FIG. 1(d), in the cover 40 and the folded body 30A, a stitching thread 50 can be provided to penetrate through both side edges of the narrow width portion 30a of the bag-shaped belt 30. As illustrated in the drawing, this stitching thread 50 can penetrate edges of the sides of the bag-shaped belt 30 that are disposed away from the seam 33 in both side edges of the bag-shaped belt 30. According to a further embodiment, the stitching thread 50 can penetrate the bag-shaped belt 30 outside of the area to be inflated. For example, the area to be inflated can be located within the area formed by the seam 33. According to another example, the stitching thread 50 can penetrate the bag-shaped belt 30 in an area formed between the seam 33 and a side edge of the bag-shaped belt 30. According to another example, the stitching thread 50 can penetrate the bag-shaped belt 30 in an area formed between the seam 33 and edges formed by ends of the bag-shaped belt 30.

By providing the stitching thread 50, the cover 40 is prevented from freely moving relative to the bag-shaped belt 30 and the worn feel of the air belt 60 is good.

According to a further embodiment, the wide width portion 30b can be adhered to the cover 40 by means of adhesive agent.

Although not shown in the drawings, a normal belt is connected to one end side of the air belt 60 in the longitudinal direction, and a tongue is connected to the other end side. A gas-receiving nozzle is provided in the tongue so that the gas from the inflator 11 is able to be introduced into inside of the air belt 60 via the gas receiving nozzle.

When the inflator 11 is activated in a condition in which the tongue is inserted into the buckle, the bag-shaped belt 30 is expanded and the stitching thread 50 is cut. The air belt 60 is thereby expanded along the occupant. At this moment, a length of the mesh cover 41 in the longitudinal direction is contracted and the air belt 60 is firmly pressed against the occupant.

In this embodiment, because the stitching thread 50 penetrates outer edge sides from the seam 33 of the bag-shaped belt 30, needle holes and/or thread holes are not caused in the expanded portion of the bag-shaped belt 30. Therefore, gas leakage from the bag-shaped belt 30 via the needle holes or thread holes is prevented and internal pressure of the bag-shaped belt 30 can be kept at a high level for a long time.

The priority application, Japanese Patent Application No. 2005-224296 filed on Aug. 2, 2005, is hereby incorporated by reference herein in its entirety.

The above-described embodiment is an example of the present invention and one of ordinary skill would understand that the present invention can take constructions other than that illustrated in the drawings. For example, the length or the shape of the bag-shaped belt is not limited to that illustrated in the drawings. Further, as for the wide width portion 30b, the stitching thread 50 may be penetrated through an expanding portion of the bag-shaped belt 30. In this case, although the gas leaks from the needle holes or the thread holes of the wide width portion 30b, the gas does not leak from the narrow width portion 30a and therefore a gas-leakage amount is reduced.

What is claimed is:

1. An air belt comprising:
    an inflatable bag portion adapted to be expanded by gas and folded into a belt-like shape to form a folded body, wherein the inflatable bag portion comprises two overlapping material sheets combined together along edges of the sheets to form an inflatable chamber;
    a stretchable cover for the folded body; and
    a stitching thread that penetrates the cover and the inflatable bag portion; wherein the stitching thread is adapted to be ruptured when the air belt is expanded,
    wherein the stitching thread penetrates the inflatable bag portion outside of the inflatable chamber.

2. The air belt according to claim 1, wherein the folded body is folded in a zigzag manner along parallel lines that extend in a longitudinal direction of the belt shaped bag.

3. The air belt according to claim 2, wherein the sheets are connected by a seam and the bag portion includes an overhanging portion that is located outside of the seam, and wherein the stitching thread penetrates the overhanging portion.

4. The air belt according to claim 3, further comprising a sealing agent located along the seam connecting the sheets.

5. The air belt according to claim 1, wherein the bag portion is configured so that a wide width portion of the sheets is folded in order to narrow the width prior to folding the entire bag portion into a belt like shape.

6. An air belt apparatus comprising:
    an air belt comprising an inflatable bag portion adapted to be expanded by gas and folded into a belt-like shape to form a folded body, wherein the inflatable bag portion comprises two overlapping material sheets combined together along edges of the sheets to form an inflatable chamber; a stretchable cover for the folded body; and a stitching thread that penetrates the cover and the inflatable bag portion; wherein the stitching thread is adapted to be ruptured when the air belt is expanded, wherein the stitching thread penetrates the inflatable bag portion outside of the inflatable chamber; and
    an inflator that is adapted to expand the air belt by supplying gas into the inflatable chamber.

* * * * *